United States Patent [19]

White

[11] Patent Number: 4,765,236
[45] Date of Patent: Aug. 23, 1988

[54] ROUND BALER HAVING INTERLOCK MECHANISM FOR ASSURING POST DISCHARGE ACTUATION OF EJECTED BALE REPOSITIONER

[75] Inventor: Bruce L. White, North Newton, Kans.

[73] Assignee: Hay & Forage Industries, Hesston, Kans.

[21] Appl. No.: 102,869

[22] Filed: Sep. 30, 1987

[51] Int. Cl.⁴ .............................................. B30B 5/06
[52] U.S. Cl. ..................................... 100/88; 100/218
[58] Field of Search ..................... 100/88, 218; 56/341

[56] References Cited

U.S. PATENT DOCUMENTS

| | | | |
|---|---|---|---|
| 4,206,587 | 6/1980 | Freimuth et al. | 100/88 |
| 4,406,221 | 9/1983 | Parrish et al. | 100/88 |
| 4,422,373 | 12/1983 | Gaeddert . | |
| 4,483,247 | 11/1984 | Coeffic | 100/88 |
| 4,683,815 | 8/1987 | Van Ryswyk | 100/88 |

FOREIGN PATENT DOCUMENTS 2138354  10/1984  United Kingdom ................. 100/88

*Primary Examiner*—Andrew M. Falik
*Attorney, Agent, or Firm*—Hovey, Williams, Timmons & Collins

[57] ABSTRACT

A round baler having a shiftable repositioning member for moving a completed, discharged bale of hay away from the baler is provided with an interlock mechanism for preventing movement of the repositioning member until such time that the bale has been discharged from the chamber. A sensor is located on a side of the baling chamber to determine the absence of a bale, and preferably takes the form of a rounded element biased toward a position normally protruding into the chamber. The presence of a bale within the chamber causes the element to shift outwardly and thereby close a valve interposed in a hydraulic circuit for providing motive fluid power to a piston and cylinder assembly that, in turn, drives the repositioning member. Once the completed bale has been discharged from the baling chamber, however, the element shifts under the bias of a spring toward its normal position protruding into the chamber to thereby close the contacts of a magnetic reed switch and open the hydraulic valve so that the repositioning member may then be activated to shift the bale away from the baler.

7 Claims, 2 Drawing Sheets

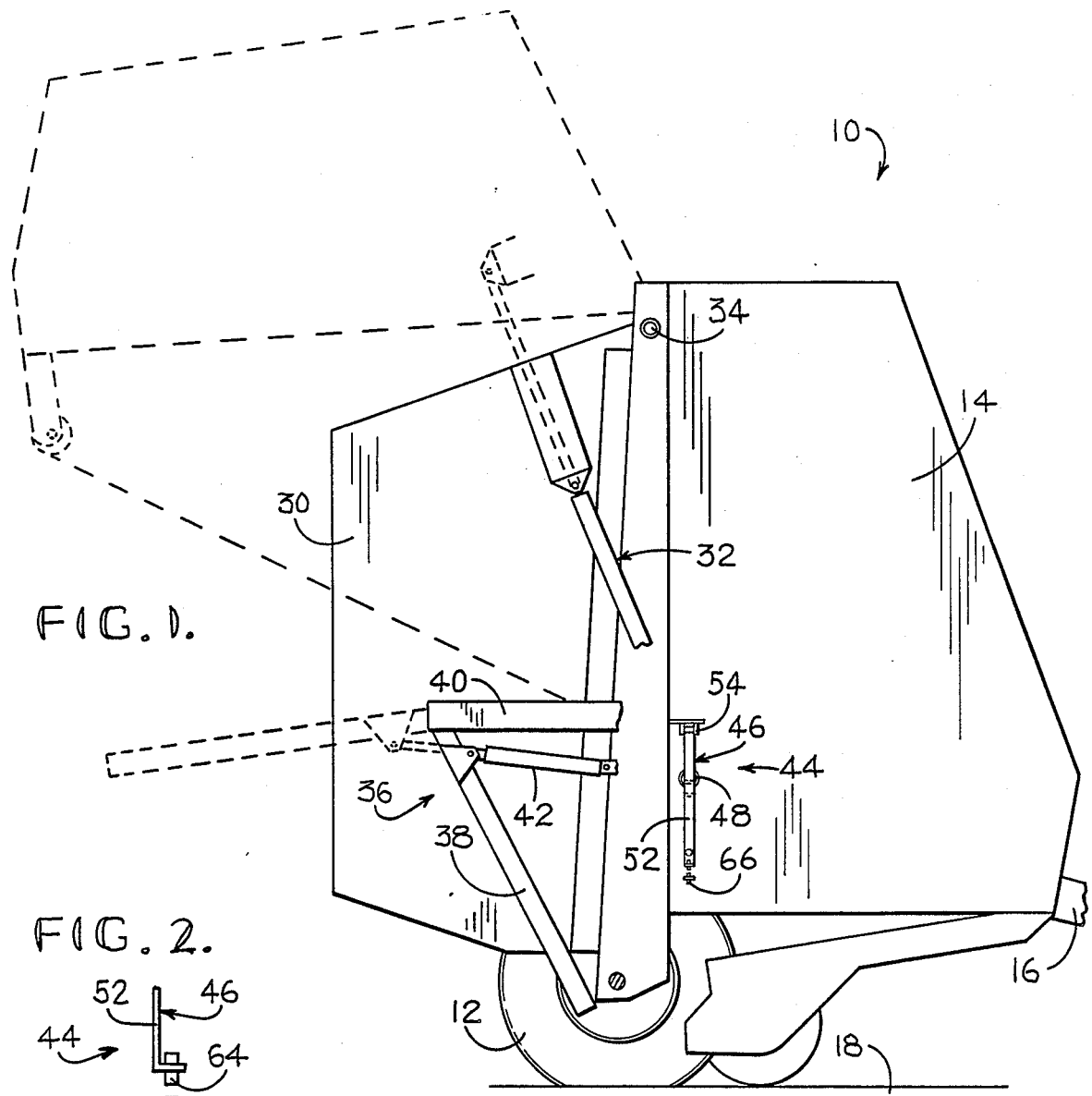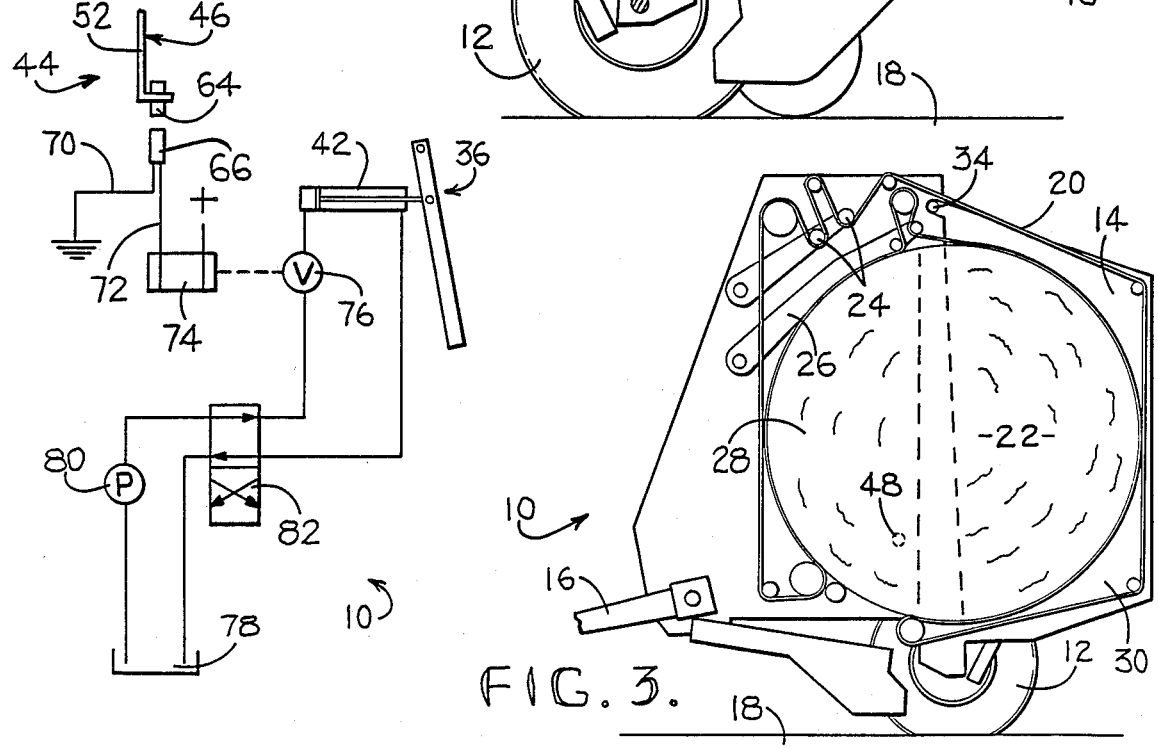

ROUND BALER HAVING INTERLOCK MECHANISM FOR ASSURING POST DISCHARGE ACTUATION OF EJECTED BALE REPOSITIONER

BACKGROUND OF THE INVENTION

1. Field of the Invention

The present invention relates to automatic apparatus for shifting a round bale of hay away from a baler once formation of the bale is complete and the latter has dropped onto the ground.

2. Description of the Prior Art

Rotary balers for producing round, cylindrical bales of hay are well known to those in the art and normally include, in broad terms, a baling chamber that is adjustably defined by a number of belts trained about a plurality of yieldably tensioned, laterally shiftable rollers. Crop fed through an inlet of the baler is introduced into a space bewteen stretches of belts moving in opposite direction which cooperate to roll the crop materials into the shape of a cylinder. As additional crop materials are introduced into the baling chamber, arms pivotally supporting the rollers shift to enable the configuration of the belts to accommodate the size of the growing bale. The arms are biased to continuously urge stretches of the belts toward the bale and allow formation of a compacted, tight bale.

Round balers are also often provided with a signalling device that alerts the operator that the bale has reached a pre-selected size. Once altered, the operator interrupts forward movement of the baler and a swingable tailgate of the baler is opened to enable the bale to drop onto the ground. In the use of certain round balers, the operator reverses the tractor to back up the baler a short distance before dropping the completed bale onto the ground, so that upon return to forward motion sufficient clearance is available between the bale and baler for closing of the tailgate and a pickup unit of the baler is in proper disposition for lifting substantially all of the crop materials without leaving a length of windrow adjacent the discharged bale.

One improvement provided in round balers in recent years has been the provision of bale repositioning apparatus for rolling completed bales discharged on the ground in a rearwardly direction away from the baler so that the operator need not back off the windrow before dropping the bales onto the ground. The repositioning apparatus may take the form of a large U-shaped member shiftable from a retracted position below an outlet of the baler and toward an extended position for engaging and urging the bale away from the baler. In some instances, a controller automatically shifts the repositioning member to move the bale once the tailgate has opened to discharge the bale onto the ground.

Normally, tension exerted by the belts on the bale cause the latter to readily fall from the baling chamber and onto the ground as soon as the tailgate is opened. In occasional circumstances, however, the bale does not drop onto the ground when the gate is opened and instead remains in the chamber. Consequently, if the bale repositioning member shifts outwardly before the bale is discharged and the bale subsequently falls in the space between the U-shaped repositioning member and the remainder of the baling apparatus, the bale will become effectively caught by the repositioning apparatus and a substantial effort must then be undertaken to free the bale.

In addition, the driver of the tractor cannot easily discern whether or not a completed bale has dropped onto the ground after the tailgate is opened, inasmuch as the height and width of round balers substantially block the driver's field of vision toward areas behind the baler. As such, a need exists for a device that prevents a bale from falling within the confines of the repositioning member.

SUMMARY OF THE INVENTION

My present invention concerns an automatic interlock mechanism which prevents actuation of a round baler repositioning member until such time that the formed bale has fallen from the baling chamber. To this end, I provide a sensor positioned to detect the absence of a bale within the baling chamber, along with control means coupled to the sensor and operable to prevent a hydraulic fluid piston and cylinder assembly from extending the repositioner whenever a bale is present within the chamber.

In a preferred embodiment of the invention, the sensor takes the form of a rounded, shiftable element which is mounted on a swingable arm and yieldably biased toward a position projecting into the baling chamber. If a bale is present within the chamber, the element and the arm are moved away from the same and a magnet secured to an end of the arm is shifted toward a disposition away from a magnetic reed switch, causing switch levers of the latter to move toward an open circuit position. The reed switch is electrically connected to a coil of a normally closed solenoid valve interposed in a hydraulic line for powering movement of the repositioning member, and therefore presence of a bale within the baling chamber closes the valve to prevent movement of the repositioning member.

Further objects of the invention will become apparent in the course of the following detailed description of the preferred embodiment of the invention.

BRIEF DESCRIPTION OF THE DRAWINGS

FIG. 1 is a fragmentary side elevational view of a round baler having an interlock mechanism constructed in accordance with the principles of the present invention;

FIG. 2 is an essentially schematic representation of a control circuit of the interlock mechanism illustrated in FIG. 1;

FIG. 3 is a fragmentary, reduced cross-sectional view of the baler shown in FIG. 1, illustrating the disposition of a completed bale within a baling chamber;

DETAILED DESCRIPTION OF THE DRAWINGS

Figure 4:
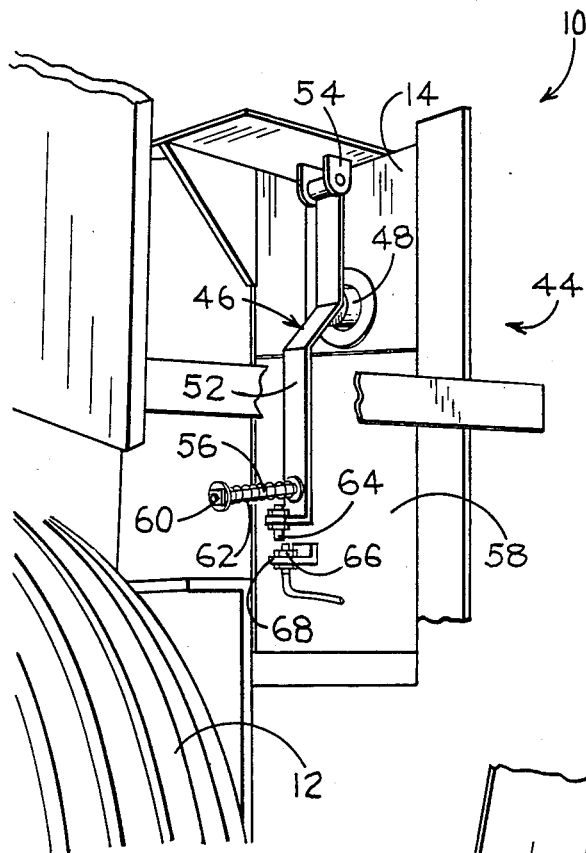
FIG. 4 is an enlarged, perspective, fragmentary view of a sensor of the interlock mechanism of FIGS. 1 and 2 for determining the presence or absence of a bale within the baling chamber.

Referring initially to FIG. 1, a baler 10 includes a chassis mounted on a pair of wheels 12 (only one shown) located on opposite sides of the baler 10 and outboard of sidewalls 14. A fore-and-aft tongue 16 extends forwardly of the baler 10 and is adapted for connection to a towing vechicle for advancing the baler 10 along a path of travel over the ground 18.

Figure 5:
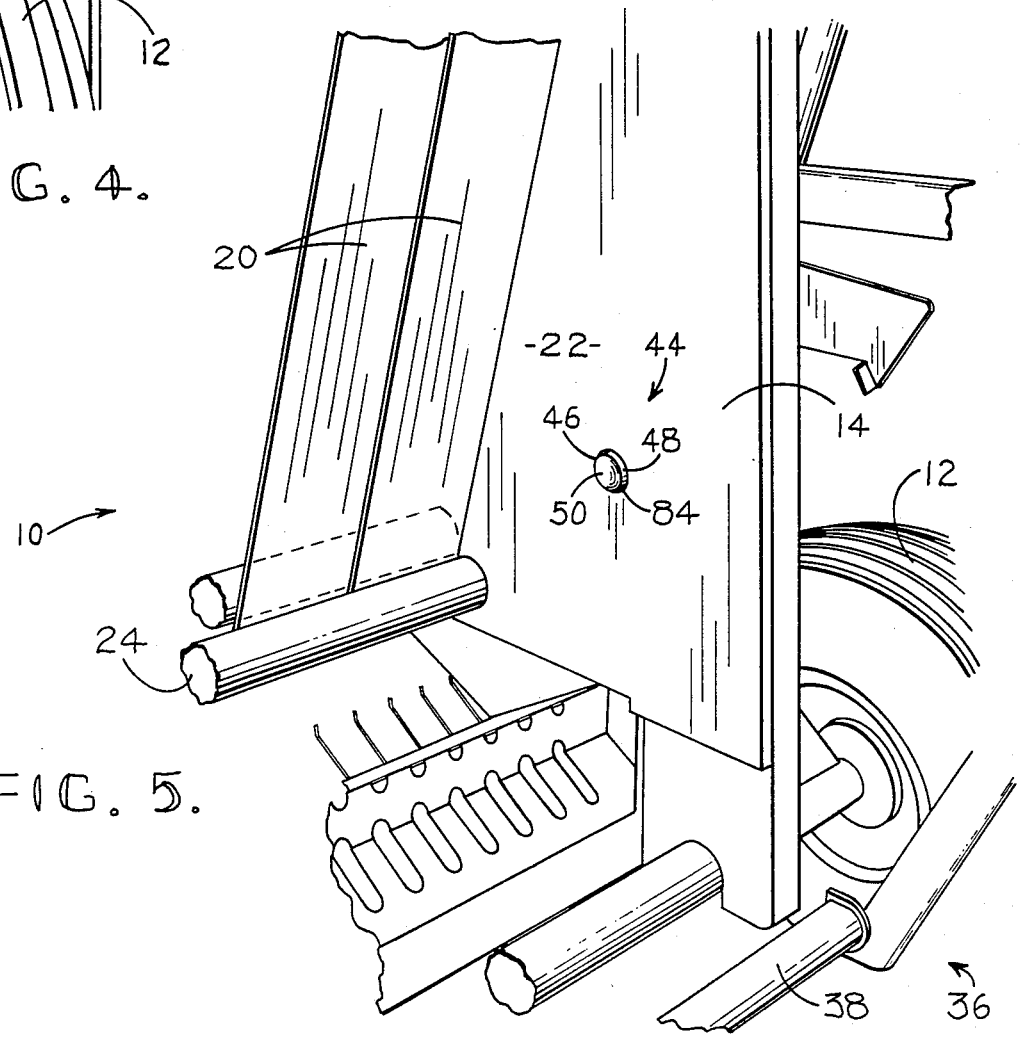
FIG. 5 is an enlarged, perspective, fragmentary view of a portion of the baling chamber shown in FIG. 3 except that the chamber is empty, also depicting a rounded element of the sensor shown in FIG. 4 which is biased to normally protrude into the baling chamber.

A series of endless, essentially identical belts 20 as shown in FIGS. 3 and 5 define a variable-sized baling chamber 22 between the sidewalls 14. The belts 20 are trained about a number of horizontally extending rollers such as rollers 24, and certain of the rollers are rotatably mounted on shiftable arms such as arm 26. Biasing means (not shown) yieldably urges arm 26 down toward lower rollers so that constant tension is exerted on the belts 20 to facilitate formation of a dense, tightly compacted bale 28 formed between stretches of the belts 20. The bale forming apparatus of baler 10, including belts 20, rollers 24 and arm 26, are known in the art and form no part of the present invention per se.

When the bale 28 reaches full size, a gate or tailgate 30 normally covering an outlet of the baling chamber 22 may be opened by means of a hydraulic piston and cylinder assembly 32 that is illustrated in FIG. 1. The tailgate 30 swings in a clamshell-like action about an upper pivot 34 from the full line orientation shown in FIG. 1 to the dashed line orientation depicted in the same drawing. Under normal circumstances, the completed bale 28 is ejected onto the ground 18 by the force exerted by tensioned belts 20, although in some cases the bale 28 may remain in the chamber 22 for one reason or another.

A bale repositioning apparatus 36 includes a U-shaped member 38 pivotally connected to a support 40 fixed relative to the chasis of baler 10. Member 38 is swingable about a horizontal axis in either direction upon admission of hydraulic fluid pressure in a selected end of a cylinder of a piston and cylinder assembly 42. When the piston of assembly 42 is urged toward an extended direction, the repositioning member 38 swings upwardly to shift a bale previously dropped onto the ground in a direction rearwardly of baler 10.

Figure 6:
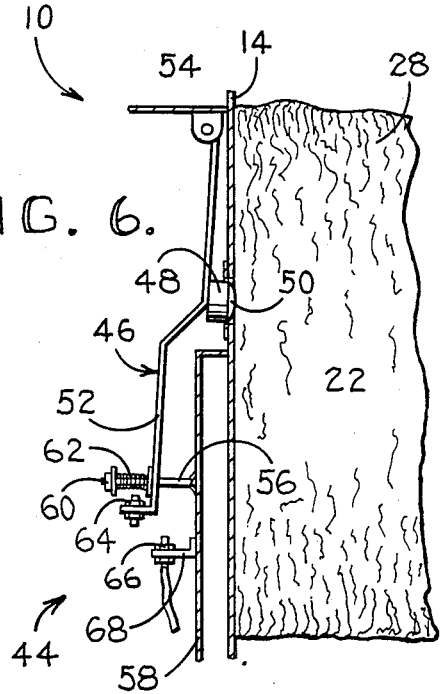
FIG. 6 is an enlarged, fragmentary, side cross-sectional veiw of the baling chamber illustrated in FIG. 4, showing the disposition of the sensor element when a bale is present within the chamber.

In accordance with the invention, an interlock mechanism, broadly designated 44, prevents extension of the piston of assembly 42 until after such time as the completed bale 28 has fallen from the baling chamber 22. As shown in FIGS. 4–6, the interlock mechanism 44 includes a sensor 46 that takes the form of a cylindrical element 48 having a rounded, bale engaging face 50.

The element 48 is fixed to an upright arm 52 (FIGS. 4 and 6) pivotally mounted for swinging movement about a horizontal axis by means of a fixed bracket 54. A stud 56, secured to an upright panel 58 of baler 10, extends through an opening in a lower region of arm 52 and carries a nut and washer assembly 60. A compression spring 62 surrounds stud 56 in the space between the nut and washer assembly 60 and the adjacent region of arm 52 for yieldably biasing the latter in a direction toward the panel 58 and urge the element 48 away from its disposition shown in FIGS. 4 and 6 and toward a position protruding into the baling chamber 22 as is shown in FIG. 5.

A lower end section of the arm 52 carries a magnet 64 that is illustrated in FIGS. 1, 2, 4 and 6. A magnetic reed switch 66 is supported by a bracket 68 secured to panel 58 in an orientation directly beneath the magnet 64 when the element 48 is in its disposition protruding into the baling chamber 22 as shown in FIG. 5 due to the absence of a bale within the chamber 22. On the other hand, the presence of a bale within chamber 22 causes the element 48 and the arm 52 connected thereto to swing toward their respective orientations shown in FIGS. 4 and 6 and thereby move the magnet 64 toward a location away from reed switch 66.

Referring now to FIG. 2, the reed switch 66 has a pair of switch levers that close toward each other to electrically connect leads 70, 72 whenever a bale is absent from the baling chamber 22 and the arm 52 has shifted toward an orientation placing magnet 64 in directly overlying relationship to reed switch 66. Lead 70 is connected to ground, while lead 72 is electrically coupled to one side of a solenoid coil 74 that is also coupled, on the other side thereof, to a source of electrical power. A plunger extending through a core of the solenoid coil 74 is mechanically linked to a hydraulic valve 76 that is normally biased toward a closed position. Closing of reed switch 66, however, energizes solenoid coil 74 to open valve 76 whenever the sensor 46 has determined that the chamber 22 is not currently holding a bale.

When the valve 76 is opened, hydraulic fluid pressure from a reservoir 78 is directed by a pump 80 through a reversing valve 82 and toward the cylinder of piston and cylinder assembly 42. When the reversing valve 82 is in its disposition shown in FIG. 2, hydraulic pressure is directed from the valve 82, through valve 76 and toward the cylinder of assembly 42, to enable the piston of the same to extend and thereby swing the repositioning member 38 in an upwardly direction, consequently shifting a bale of hay previously discharged onto the ground in a direction away from baler 10.

Presence of the bale 28 within baling chamber 22, however, shifts element 48 through an aperture 84 in the sidewall 14 of baler 10 and away from its normal positon protruding into the chamber 22, to simultaneously cause magnet 64 to shift away from reed switch 66 and toward the orientation that is shown in FIGS. 4 and 6. Under these circumstances, the switch levers of reed switch 66 open to interrupt power to the solenoid coil 74 and enable the valve 76 to return under the bias of a spring toward its normally closed position and thereby prevent the pressure of hydraulic fluid from reaching the cylinder of piston and cylinder assembly 42. Consequently, the presence of bale 28 within chamber 22 prevents extension of the repositioning member 38 so that the bale 28 cannot subsequently fall and land in a position within the U-shaped configuration of member 38. In this regard, it is to be noted that the magnetic reed switch 66, and the solenoid coil 74 comprise a control means for preventing actuation of the piston and cylinder assembly 42 until such time as the sensing means or sensor 46 has detected the absence of a bale within chamber 22.

It can now be appreciated that the automatic interlock mechanism 44 of the invention provides an especially effective means for assuring that a completed bale of hay has been discharged from the chamber 22 before actuation of the repositioning member 38. It is realized, however, that various modifications or additions may be effected to the currently preferred embodiment described herein without departing from the essence of my contribution to the art. For example, other types of sensors may be used in place of sensor 46, and components of the hydraulic circuit such as valve 76 may be altered from that which is shown. Consequently, the invention should be deemed limited only by a fair scope of the claims that follow, along with their mechanical equivalents thereof.

I claim:

1. In a round baler having structure defining a baling chamber with an outlet, a gate normally covering said outlet, and means for opening said gate upon formation of the bale in order to discharge said bale from said baling chamber and onto the ground, bale repositioning apparatus comprising:

a repositioning member;

means activatable to shift said member along a path of travel for contact with a bale discharged onto the ground and for movement of said discharged bale away from the baling chamber;

means for sensing the absence of a bale within said baling chamber; and control means operatively connected with said sensing means and said shifting means for normally preventing activation of said shifting means and thereby movement of said repositioning member until such time as said sensing means has sensed the absence of a bale within said chamber.

2. The invention as set forth in claim 1, wherein said means for sensing the absence of a bale within said baling chamber comprises a shiftable element normally protruding into the chamber for engagement with a bale.

3. The invention as set forth in claim 2, wherein said element is yieldably biased in a direction toward said baling chamber.

4. The invention as set forth in claim 3, wherein said element is mounted on a shiftable upright arm for movement therewith.

5. The invention as set forth in claim 2, wherein said element presents a rounded bale engaging face.

6. The invention as set forth in claim 1, wherein said control means includes a solenoid controlled hydraulic valve operatively connected to said sensing means.

7. The invention as set forth in claim 1, wherein said sensing means includes an element engageable with the bale within said baling chamber and means mounting said element for shifting movement upon engagement with said bale, and wherein said control means includes switch means operable to sense the disposition of said element.

* * * * *